Jan. 13, 1925.

A. O. JENSEN 1,522,631

TOY VEHICLE

Filed July 10, 1922

Inventor

A. O. Jensen,

By Arthur H. Sturges.

Attorney

Jan. 13, 1925.

A. O. JENSEN

TOY VEHICLE

Filed July 10, 1922

Inventor
A. O. Jensen,
By Arthur H. Sturges.
Attorney

Patented Jan. 13, 1925.

1,522,631

UNITED STATES PATENT OFFICE.

ALBERT O. JENSEN, OF OMAHA, NEBRASKA.

TOY VEHICLE.

Application filed July 10, 1922. Serial No. 573,961.

*To all whom it may concern:*

Be it known that I, ALBERT O. JENSEN, a citizen of the United States, residing at Omaha, in the county of Douglas and State of Nebraska, have invented certain new and useful Improvements in Toy Vehicles, of which the following is a specification.

The present invention relates to vehicles adapted for use by children and which may be propelled by direct contact of the feet with the ground. An object of the present invention is to provide a vehicle of this type which may be used as an amusement device and exerciser by children; which is strong and durable and capable of continued use for a period of time; which may be adjusted from time to time for increasing the size of the device to accommodate the child during growth and to provide a device which may be easily manipulated and controlled without the exercise of skill.

Another object of the invention is to provide a vehicle of this general character with a dumping body or container for sand and the like so that the child may transport material or articles and may operate the dumping structure by merely pulling the cord or other operating device to increase interest and amusement in the use of the vehicle.

With the foregoing and other objects in view, the invention will be more fully described hereinafter, and will be more particularly pointed out in the claims appended hereto.

In the drawings, wherein like symbols refer to like or corresponding parts throughout the several views, Fig. 1 is a longitudinal vertical section of a vehicle constructed according to the present invention.

Figure 3:
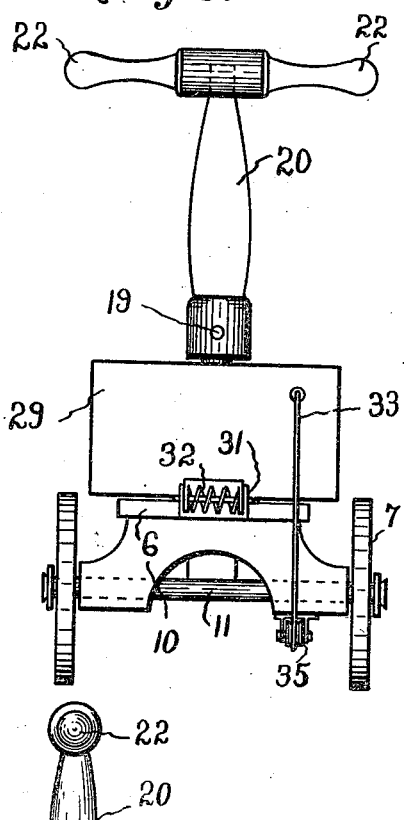
Fig. 3 is a rear elevation of the vehicle.
Figure 4:
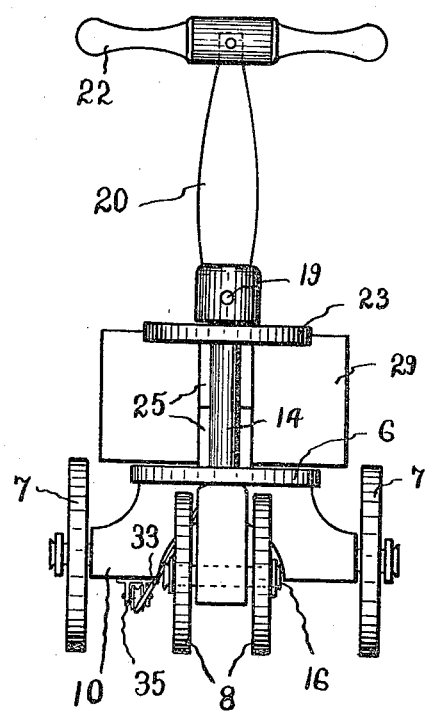
Fig. 4 is a front elevation of the same.

Referring more particularly to the drawings 6 designates a platform supported upon the widely spaced rear wheels 7 and upon comparatively closely assembled front wheels 8. Near the rear, the platform is provided at its under side with a transversely extending groove 9 forming a seat into which is received the rear bolster or beam 10, the intermediate portion of which is arched upwardly as indicated in Fig. 3, while the ends are offset downwardly to receive and form bearings for the rear axle 11 which directly carries the wheels 7. Suitable bolts 12 in requisite numbers are provided to attach the bolster or beam firmly to the platform 6.

The front end portion of the platform 6 is apertured as indicated at 13 to receive the cylindrical portion 14 of the front standard or steering post which is enlarged at its lower end to provide a shoulder 15 on which the platform is supported. The lower squared part of the column carries the front axle 16 to which the wheels 8 are secured. The upper part of the steering standard 14 is provided with transverse openings 17 and 18 adapted to receive a pin 19 by which the steering mast 20 which is provided with a socket 21 to receive the upper end of the column 14, is adjustably secured thereto. The mast 20 carried cross arms 22 for engagement by the hands to steer the vehicle.

Figure 1:
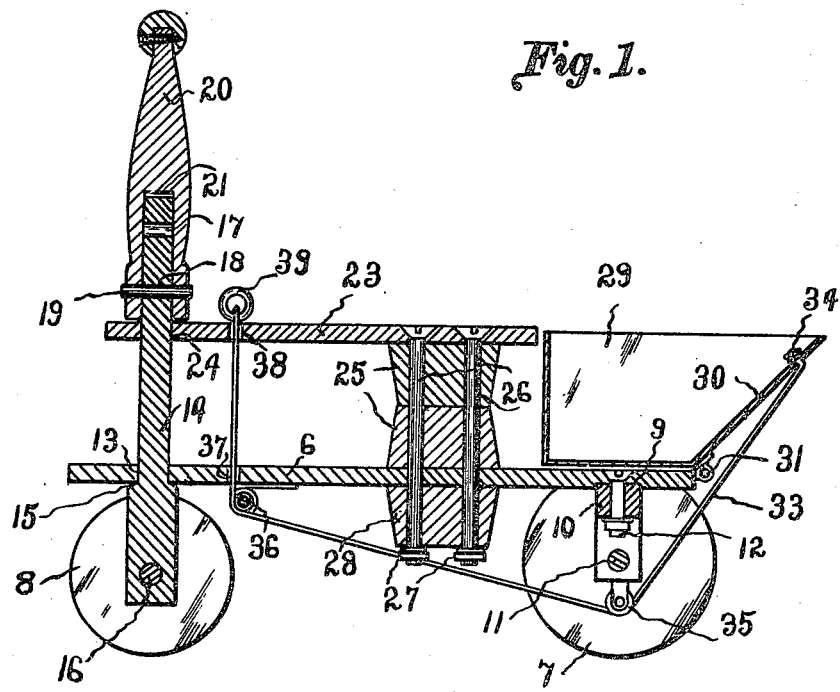
Figure 2:
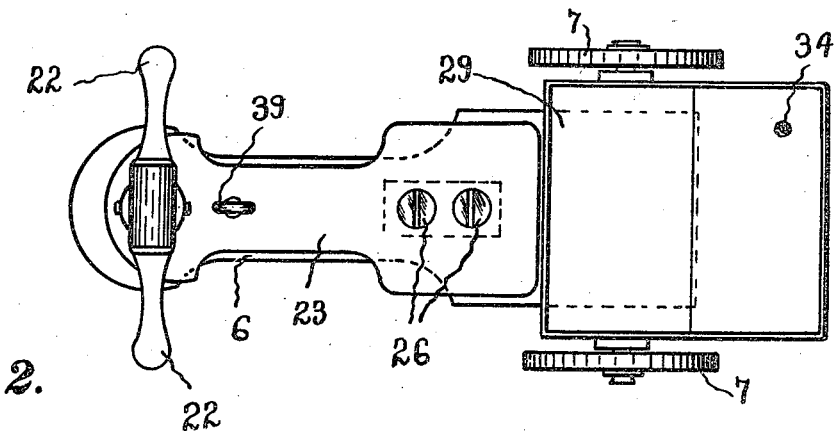
Fig. 2 is a top plan view thereof.
Figure 5:
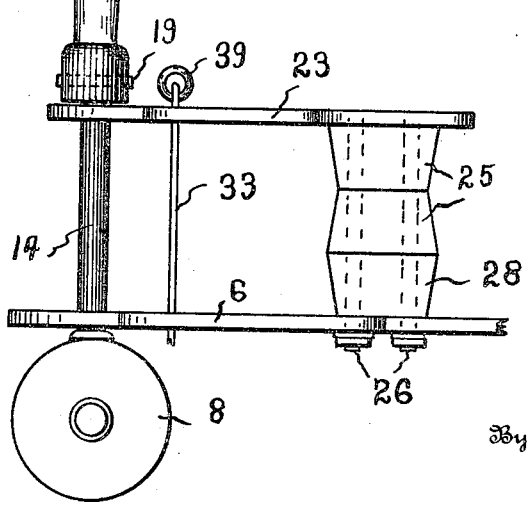
Fig. 5 is a fragmentary view showing the device adjusted from the smaller size of Fig. 1 to a relatively larger size for accommodating an older child.

The seat member 23 is carried above the platform at the forward portion of the vehicle and is provided with an aperture 24 to fit about the cylindrical portion of the standard 14 just beneath the lower end of the mast 20. The rear end of the seat member 23 is supported upon a number of blocks 25 resting upon the platform 6 and secured to the seat member and to the platform by the use of bolts 26 having nuts with spring washers 27 threaded thereon. The heads of the bolts are countersunk in the seat member. One or more additional blocks 28 may be normally held by bolts 26 beneath the platform 6 to be used in elevating the seat member 23 as shown in Fig. 5. In Fig. 1 the block 28 forms an elongated lower bearing for the bolts and serves to more rigidly hold the seat member in position and against vibration.

The rear wider end of the platform 6 is arranged to receive a dump body 29 having a sloping rear wall 30 to facilitate discharge of the contents. The dump body 29 is adapted to rotate about a hinge 31 provided between it and the platform, the hinge having associated therewith a spring 32 shown in Fig. 3 which normally acts to restore the dump body to the position shown in Fig. 1 upon the platform. The cord or flexible connection 33 is used to tilt the body, such cord being knotted as indicated at 34 after being passed through an opening made in this sloping rear wall 30 near the top thereof and at one side as appears in Fig. 3. The cord 33 runs downwardly beneath the vehicle and under a pulley 35 carried by the rear beam 10 and likewise through a pulley or eye 36 arranged beneath the forward part of the platform 6 just in rear of the steering apparatus. The cord is then guided upwardly through an opening 37 made in the platform 6 and through a registering opening 38 in the seat member 23. A ring or other handle 39 is connected to the upper end of the cord to facilitate pulling upon the same and to prevent its unthreading through the openings.

In operation, a child straddles the seat member 23 and pushes the vehicle along by treading with the feet upon the pavement or other surface meanwhile holding the cross-handles 22 which are turned to steer the vehicle. Sand or other material may be loaded into the dump body 29 and after conveyance to the destination may be removed without leaving the seat by pulling upon the ring 39. The body will be caused to swing about the hinge 31 until the weight of the same will assist this movement and cause the overturning of the body and the sliding of the material down the sloping wall 30. As soon as the body is empty and the cord released the spring will restore the same to upright position upon the platform.

For taller children the block 28 may be removed from beneath the platform 6 and interposed with the blocks 25 between the platform and seat. This arrangement is shown in Fig. 5, and increases the leg room of the device. In order to accomplish this the pin 19 of the steering apparatus must be first removed and the mast 20 adjusted upwardly to enable the pin to be reinserted in the upper opening 17 of the standard. The flexible cord will also have to be lengthened, but it can be taken care of easily at the knot 34. The operation is the same after this adjustment as before.

It will be appreciated that the invention provides both an instructive and amusing form of apparatus for children from which a great amount of exercise may be secured and in which the parts are durable and compact.

I have illustrated and described a preferred and satisfactory embodiment of my invention, but it is obvious that changes may be made therein within the spirit and scope thereof as defined in the appended claims.

I claim:

1. A vehicle for children's use including a platform, wheels supporting the platform, a seat adjustably held above the platform, and a steering apparatus having an operating member adjustable with the seat and engaging therewith.

2. A vehicle for children's use including a seat, a platform below the seat and extending to the rear thereof, wheels supporting the platform for movement, means for adjusting the elevation of the seat from the platform, an adjustable steering apparatus having engagement with the platform and seat, and a dump body in rear of the seat and supported on the platform.

3. A vehicle for children's use comprising a platform, rear wheels secured thereto, front wheels for the platform, a column holding said front wheels and supporting the platform, a seat above the forward part of the platform, blocks to adjustably hold the seat, an adjustable steering mast connected to the column above the seat, a dump body pivoted to the rear of the platform, spring means to raise the body, and a flexible connection to tilt the body.

In testimony whereof, I have affied my signature in presence of two witnesses.

ALBERT O. JENSEN.

Witnesses:
ARTHUR H. STURGES.
HIRAM A. STURGES.